(12) United States Patent
Chang (10) Patent No.: US 8,581,965 B2
(45) Date of Patent: Nov. 12, 2013

(54) MEANS AND FACILITY FOR 3D IMAGING

(76) Inventor: Jui-Tsung Chang, Yangmei (TW)

( * ) Notice: Subject to any disclaimer, the term of this patent is extended or adjusted under 35 U.S.C. 154(b) by 404 days.

(21) Appl. No.: 12/959,422

(22) Filed: Dec. 3, 2010

(65) Prior Publication Data

US 2011/0149046 A1   Jun. 23, 2011

(30) Foreign Application Priority Data

Dec. 21, 2009   (CN) .......................... 2009 1 0247077

(51) Int. Cl.
*H04N 13/02* (2006.01)
(52) U.S. Cl.
USPC ................... 348/50; 349/15; 359/23; 359/15; 359/466
(58) Field of Classification Search
USPC ........................ 348/50; 359/23, 466; 349/15
See application file for complete search history.

(56) References Cited

U.S. PATENT DOCUMENTS

| 7,059,729 | B2 * | 6/2006 | Hoshino et al. | 353/94 |
| 7,663,707 | B2 * | 2/2010 | Kawakami et al. | 349/15 |
| 2004/0021680 | A1 * | 2/2004 | Hara | 345/700 |
| 2006/0066810 | A1 * | 3/2006 | Shestak | 353/7 |
| 2006/0171008 | A1 * | 8/2006 | Mintz et al. | 359/15 |

* cited by examiner

*Primary Examiner* — Anner Holder
(74) *Attorney, Agent, or Firm* — Chun-Ming Shih (57) ABSTRACT

A means for 3D imaging takes two plane pictures of an object in different angles and respectively projects the correspondent images of the object toward users' eyes. Accordingly, the visual data would be transmitted to user's brain and integrated to construct a solid vision. A facility for 3D imaging comprises a multiple image projector consisting of a displaying unit installed on a refracting unit. Wherein, the displaying unit performs a plurality of images, and the refracting unit adopts an optical unit. Thereby, image beams generated by the displaying unit would travel through the refracting unit and deflect by a certain angle. Accordingly, the images shot from two different angles would be respectively projected into user's eyes, and a solid vision could be constructed.

10 Claims, 14 Drawing Sheets

MEANS AND FACILITY FOR 3D IMAGING

BACKGROUND OF THE INVENTION

1. Field of the Invention

The present invention relates to means and facility for presenting a solid image, which especially utilizes a displaying unit and a refracting unit to project images acquired by different angles toward human eyes, thereby presenting the solid image.

2. Description of the Related Art

The technology develops and progresses with each passing day. The function of various video facilities also becomes more powerful. Spectacularly, the facility for displaying images further focuses on the improvements in the larger picture dimension, the higher color quality, and the more contracted body. In the past, the conventional television or computer monitor containing cathode ray tubes is in fact very bulky. Nowadays, the invention of the LCD displaying unit brings about a shrinking dimension. Namely, the thickness or the weight of the displaying unit is lessened. Preferably, the color quality is promoted to present the truecolor nearly the same as the reality.

Nonetheless, people live in a 3D space, but the LCD monitor merely displays 2D images. Even the most saturated color or the finest pixel could be displayed through the LCD monitor, a solid image that shows the real formation of an object is still difficult to be presented. Therefore, how to present a "solid image" becomes an important issue.

Figure 1:
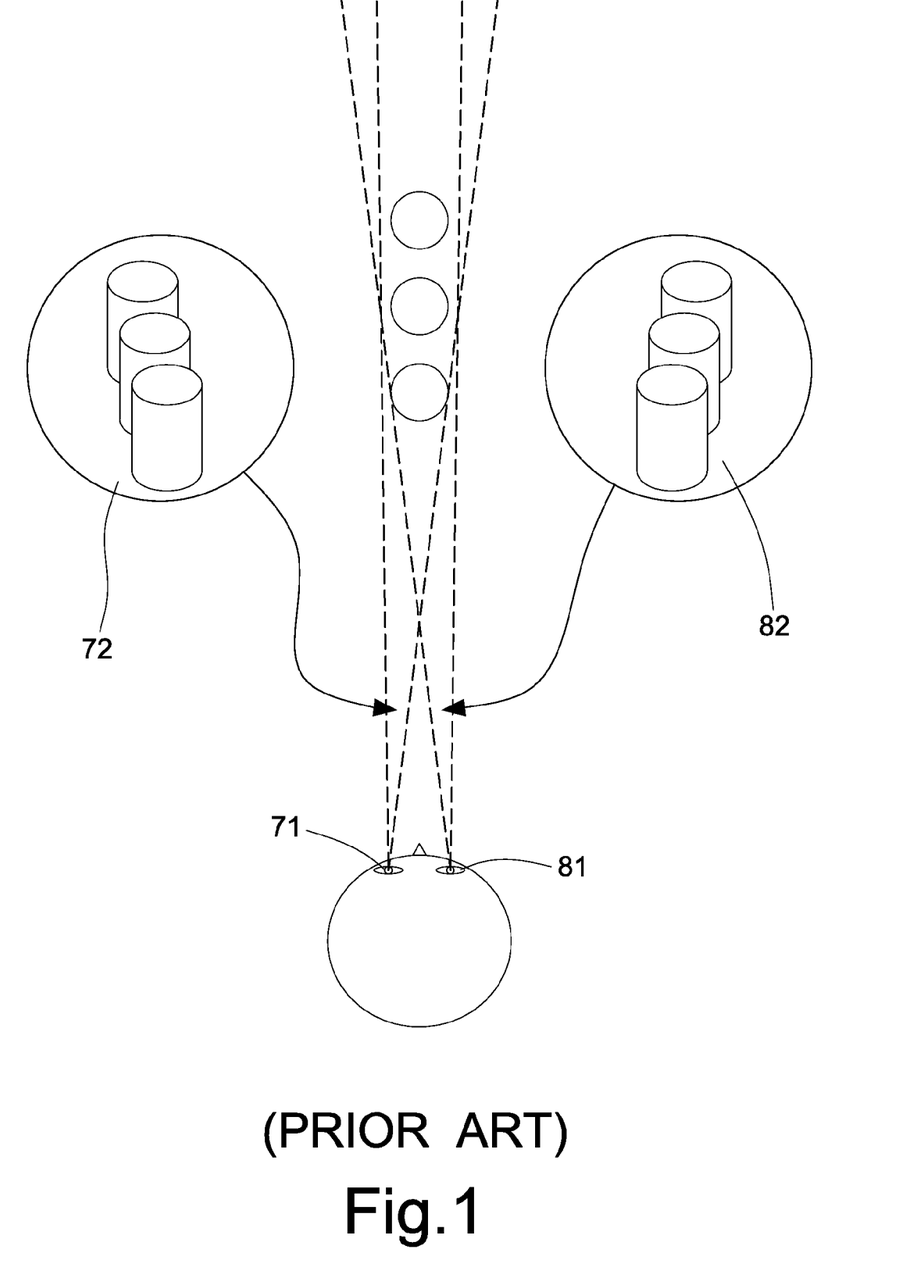
FIG. 1 is a schematic view of a conventional means for imaging a solid image by the binocular parallax principle.

A vision of a solid object in human eyes is shown in FIG. 1 through the binocular parallax of an imaging principle. A human left eye 71 sees an image 72 of a left side of the object. Herein, the left eye 71 can not see an image of a right side of the object. Concurrently, a human right eye 81 sees an image 82 of the right side of the object. Herein, the right eye 81 can not see the image of the left side of the object. Accordingly, the eyes input the visual data to the brain, and the /brain integrates the visual data so as to construct a solid vision.

Obviously, while 2D images acquired by different deflecting angles from the respective left side and the right side of the object are concurrently projected into human eyes, and while the brain further integrates the visual data, a solid vision could be constructed. The existing imaging technology for the solid image is developed in accordance with afore principle.

Figure 2:
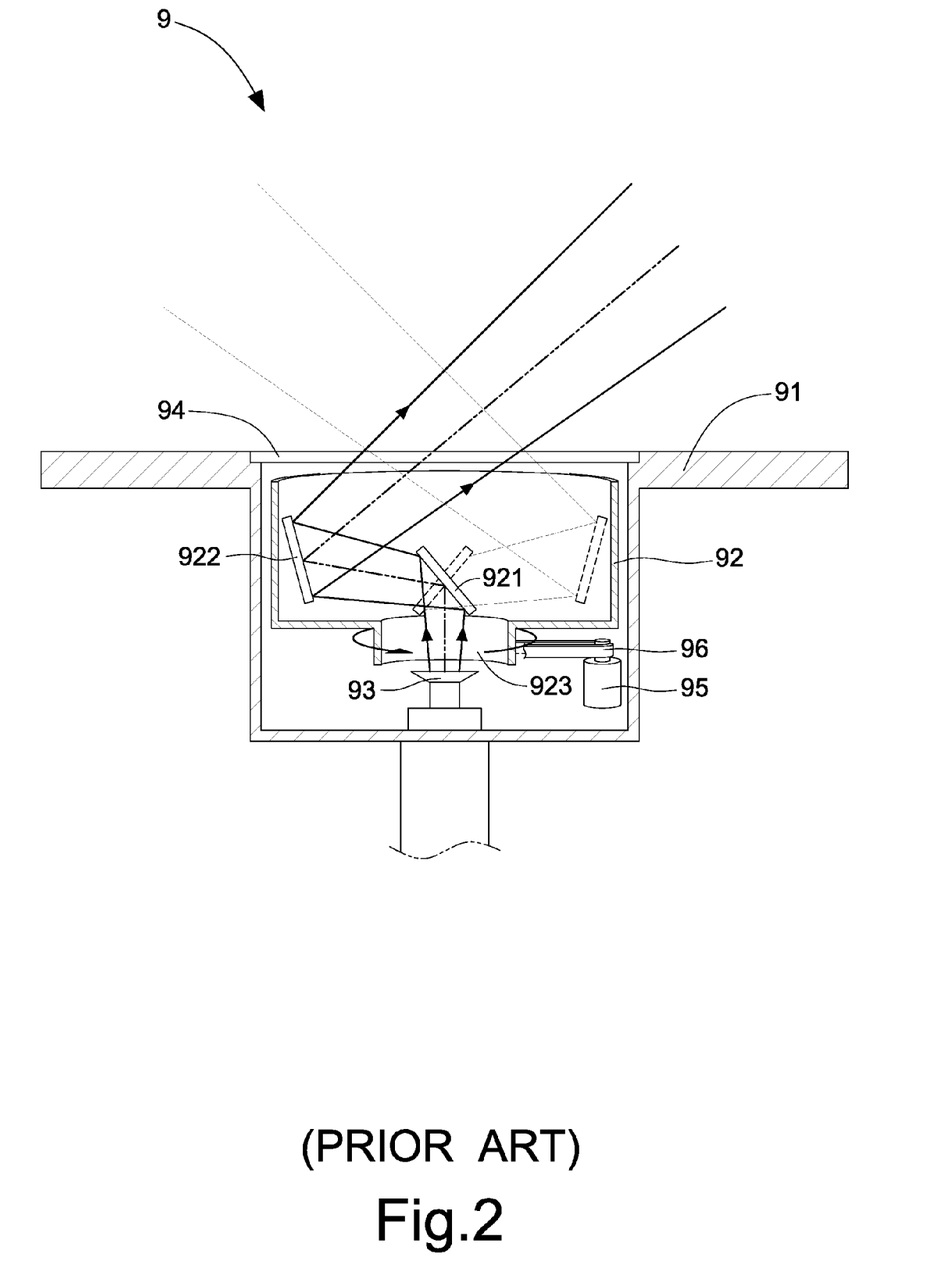
FIG. 2 is a cross-sectional view showing the existing solid image generator.
Figure 3:
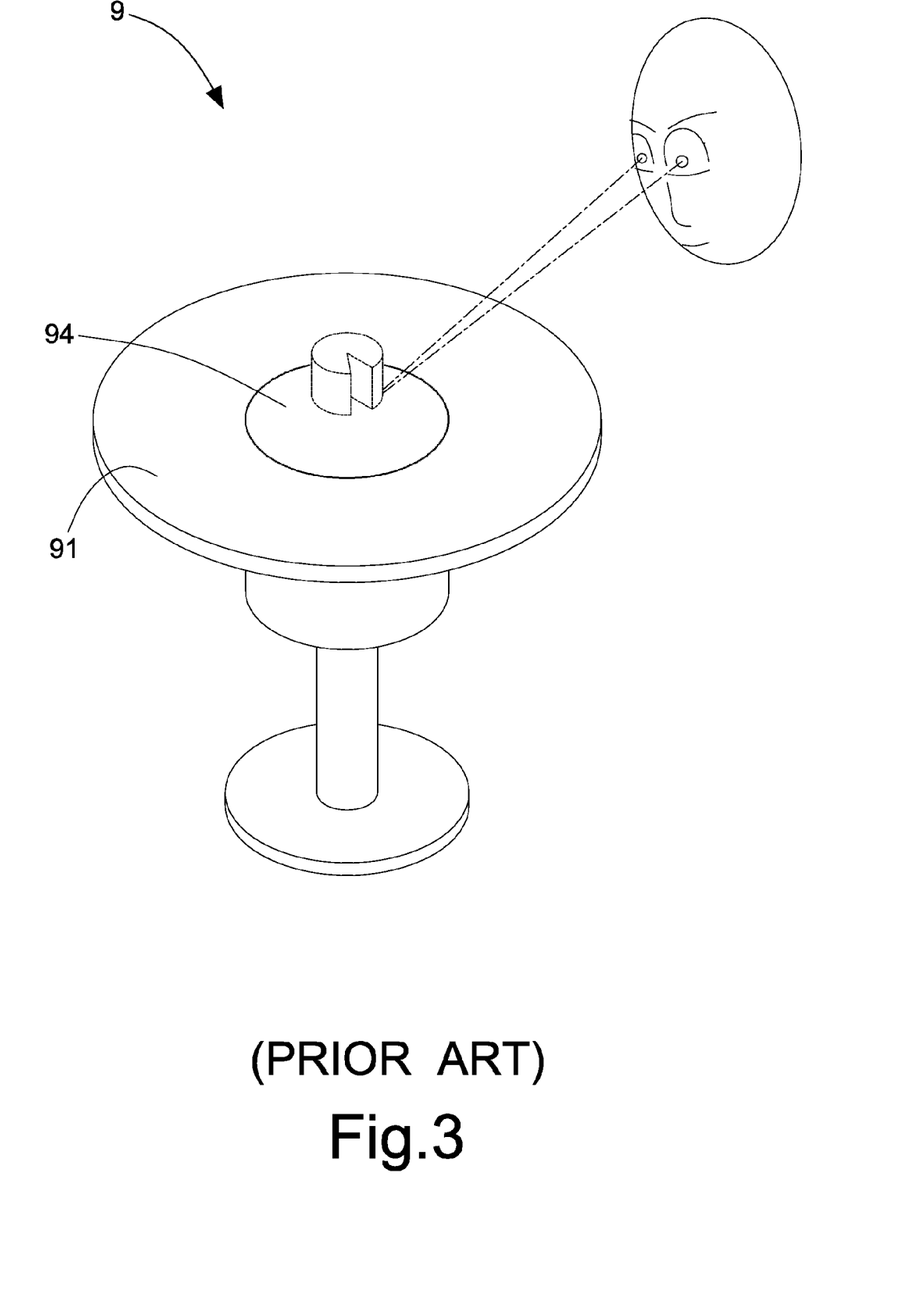
FIG. 3 is a schematic view showing the existing solid image generator constructing a solid image.

A conventional solid image generator 9 is shown in FIGS. 2 and 3. A table 91 with a proper accommodating room is installed with a hollow casing pillar 92 therein. The casing pillar 92 includes a first lens 921 and a second lens 922. The first lens 921 is installed along a central axis of the casing pillar 92, and a lower part of the first lens 921 is further arranged with an opening 923. A projector 93 is disposed along a lower part of the central axis of the casing pillar 92, and a lens 94 covers a top part of the casing pillar 92. A driving motor 95 is arranged properly next to the casing pillar 92. The driving motor 95 is connected to the casing pillar 92 by a belt 96.

Accordingly, the projector 93 projects a plane image upward, and thereby image beams further travel through the opening 923 for staying at the first lens 921 and then being reflected to the second lens 922. Continuingly, the second lens 922 further reflects the image beams toward the lens 94. Finally, an included angle is generated between the image beams and the tabletop. Whereby, the light beams go out of the lens 94 along the included angle. Further, the driving motor 95 rotates the casing pillar 92 through the belt 96. Thereby, the image beams are surroundingly projected with 360 degrees.

In fact, the images projected by the projector 93 are actually various images of the object that is shot in accordance with different angles. Namely, when the casing pillar 92 is rotated, the projector 93 thence projects images of different angles in sequence. For example, when the casing pillar 92 is rotated to a first angle, the projector 93 thence projects a first image; when the casing pillar 92 is rotated to a second angle, the projector 93 thence projects a second image. The rest may be deduced by analogy. When the casing pillar 92 finishes a complete rotation, images from all angles of the object could be acquired.

When people stand at the table 91, the images are projected to human eyes. Herein, the left eye and the right eye respectively receive two individual images of the object with respect to adjacent angles. Thereby, human brain further integrates the images and then generates a virtual solid image (as shown in FIG. 3).

Although the existing solid image generator 9 could generate the solid image, two sets of lenses are required for reflecting images. Moreover, the speed of the driving motor 95 motivating the casing pillar 92 has to be in consistence with the projecting speed from the projector 93. As a result, the conventional solid image creator 9 still needs a large dimension, and the structure thereof is somewhat complicated. The practicability is in doubt.

The present invention is developed for amending the existing shortcomings of the solid image.

SUMMARY OF THE INVENTION

The object of the present invention is to provide means and facility for 3D imaging whose dimension is lessened and whose structure is simplified.

A means for 3D imaging, wherein, an object is surrounded by a fixed distance and circumferentially shot from equal angles for acquiring a plurality of plane frames. Any two of the frames in different angles are coherently projected via a displaying unit and respectively deflected by a refracting unit into human eyes. Visual data of the two plane frames are transmitted to human brains for being integrated to accordingly present a solid image of the object.

A facility for 3D imaging, wherein, a multiple image projector comprises a displaying unit and a refracting unit. Wherein, the displaying unit has a displaying area formed with a central area therein; the displaying area except for the central area is divided into picture frames, each of which is able to display an individual image; the displaying unit creates image beams;

the refracting unit is installed on the displaying unit; a dimension of the refracting unit justly covers a scope of the displaying area, thereby allowing a penetration of the image beam to deflect toward a designated direction;

while individually presenting images of different angles from each of the picture frames, each image beam travels through the refracting unit and then deflects to the designated direction by a designated angle; whereby any two of the images of different angles are respectively projected to human eyes to present a solid image.

Preferably, the displaying unit adopts an LCD displaying unit, an organic LED displaying unit, an array-based LED displaying unit, or a plasma displaying unit.

Preferably, the displaying area freely adopts a rounded shape; the central area is formed at a center of the rounded displaying area; plural concentric rings are arranged outside the central area; numerous radial lines equidistantly radiate from the center of the central area; the rings and the radial lines are interlaced crisscross so as to divide the displaying area into several picture frames.

Preferably, the refracting unit adopts an optical unit formed with a round plate; the image beams traveling through the refracting unit further deflect toward a direction of a center axis of the optical unit; the refracting unit deflects beams along a direction deviating from the center axis.

Preferably, the displaying area adopts a rounded shape; the central area is formed at a center of the rounded displaying area; the refracting unit adopts an optical unit formed with a rounded plate; a center of the refracting unit is aligned with the center of the central area so as to be integrally mounted on the displaying unit.

Preferably, deflections of the image beams converge on a specified spot, which becomes an imaging area.

Preferably, the optical unit adopts an optical lens, a diffraction unit, or a prism capable of deflecting beams; the optical unit further adopts a micro structure formed with multiple concentric rings or a micro structure formed with interference fringes of hologram.

Preferably, within the persistence of vision, the picture frame convolutes backward with respect to any proper angle along a center of the central area equiangularly; the proper angle is one third, a quarter, or one fifth base on the center.

Preferably, the persistence of vision is a phenomenon of eyes by which an afterimage is thought to persist for a short time.

Thereby, the object that is to be shot to construct a solid image is surroundingly photographed with different angles but in equidistance, thereby acquiring a plurality of plane pictures of the object. Wherein, the pictures are sent to the displaying unit. Whereby, all the plane pictures are surroundingly arranged around the central area in the shooting order. Each image beam penetrating the refracting unit further deflects toward the center axis. At the same time, an observer stands at the multiple image projector, and the image beams respectively project images of two adjacent angels toward observer's eyes. Herein, since the visual data received via observer's eyes are directed to the same object with slightly different angles respectively from the right side and the left side of the object, the observer's brain is able to further integrate the visual data and construct a solid vision. Thereby, observer is able to see a virtual solid image.

Practically, the displaying unit and the refracting unit could freely adopt a plate formation. Moreover, the displaying unit could alternatively remove the driving motor but still displays a plurality of images. Thereby, the present invention contributes to a shrinking dimension, a simplified structure, and a durable function.

DETAILED DESCRIPTION OF THE PREFERRED EMBODIMENTS

Figure 4:
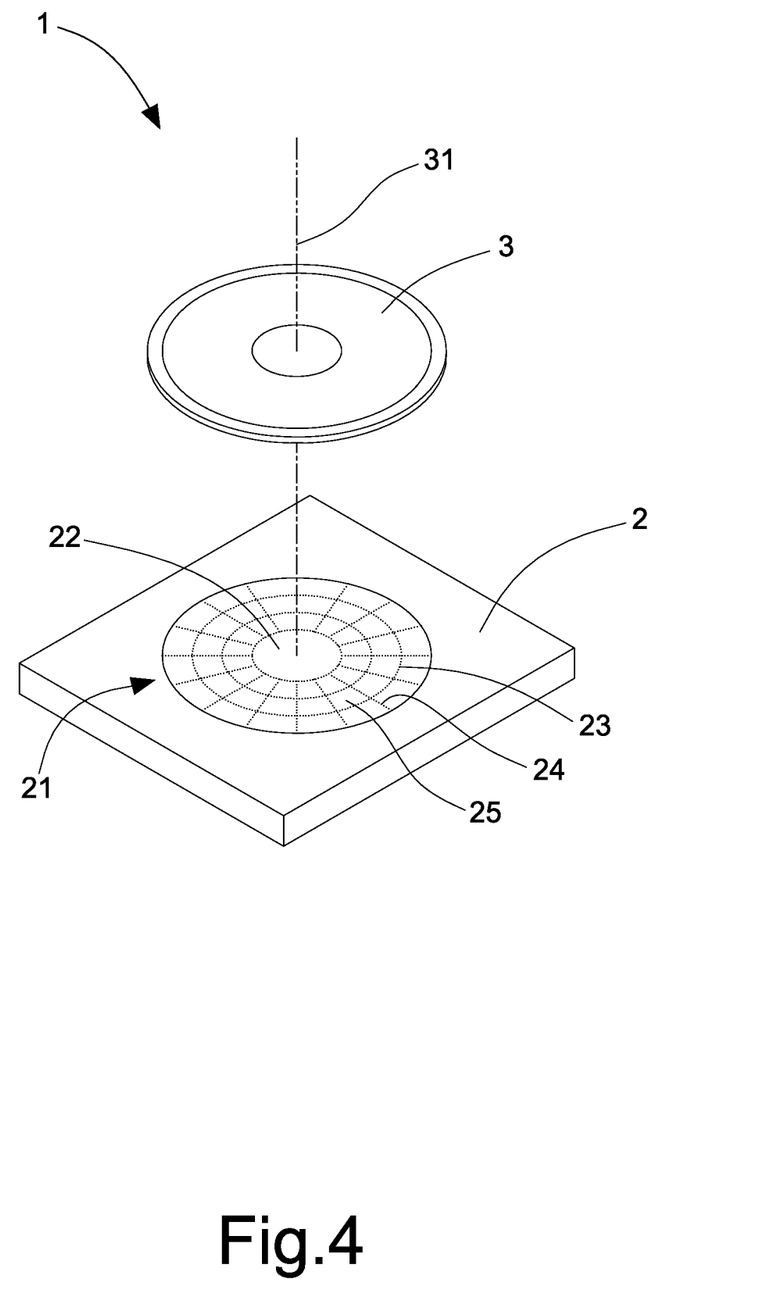
FIG. 4 is an exploded view showing the present invention.
Figure 5:
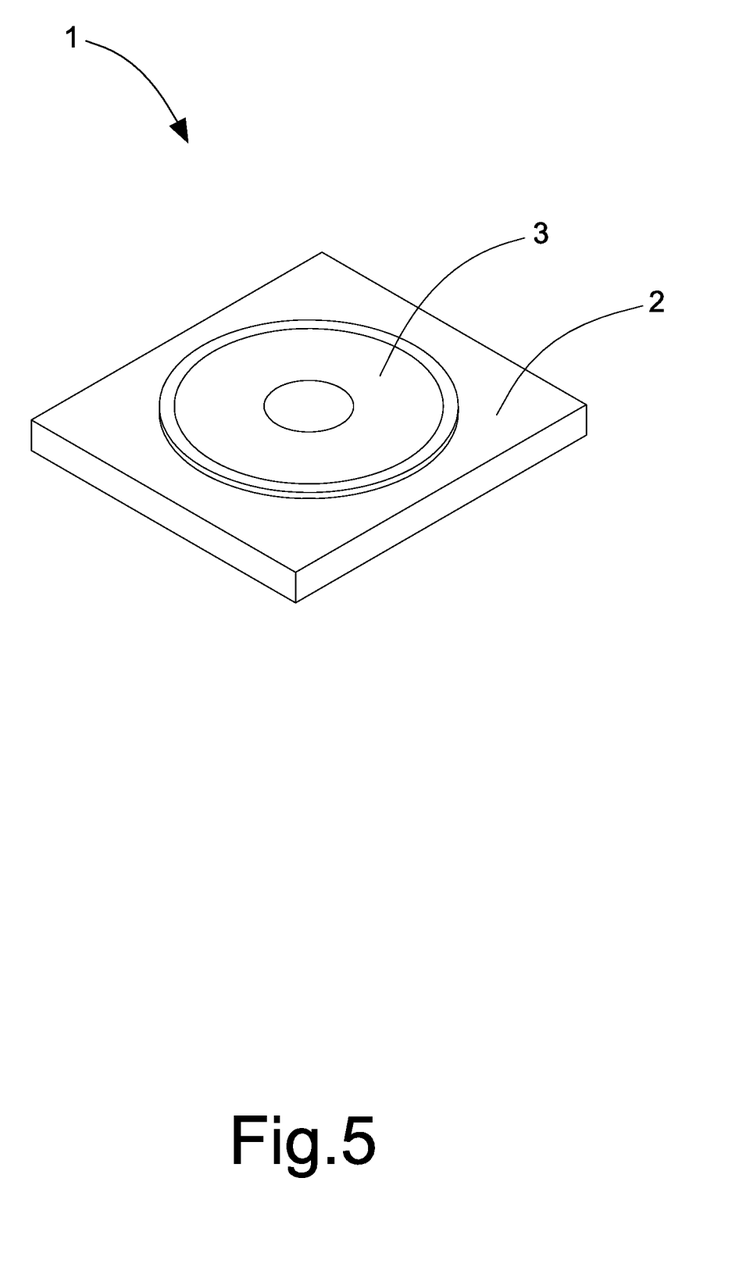
FIG. 5 is a perspective view showing the present invention.

Means and facility for 3D imagine is shown as follows:

Referring to FIGS. 4 and 5, the means for 3D imaging in accordance with the present invention is to concurrently project at least two frames that are shot from different angles toward a refracting unit, thereby deflecting the projected frames into human eyes for accordingly presenting a solid image of the object.

A facility for 3D imaging, wherein, the facility is a multiple image projector 1 comprising a displaying unit 2 and a refracting unit 3. Wherein, the displaying unit 2 adopting a flat displaying unit has a rounded displaying area 21 defined in a proper place; the displaying area 21 is formed with a central area 22 therein; two concentric rings 23 are arranged outside the central area 22 and inside the displaying area 21; sixteen radial lines 24 radiate from a center of the displaying area in equidistance; the rings 23 and the radial lines 24 are interlaced crisscross so as to divide the displaying area 21 out of the central area 22 into forty-eight picture frames 25; each picture frame 25 is able to present individual image;

the refracting unit 3 adopting a rounded optical unit which is directed to an optical lens, a diffraction unit, or a prism capable of deflecting beams; the optical unit further adopts a micro structure formed with multiple concentric rings or a micro structure formed with interference fringes of hologram; when the image beams travel upward through the lens, the image beams deflect toward the center axis 31 of the lens; a center of the refracting unit 3 is aligned with the center of the displaying area 21 so as to be integrally mounted on the displaying unit 2; wherein, a dimension of the refracting unit 3 justly covers a scope of the displaying area 2.

Figure 6:
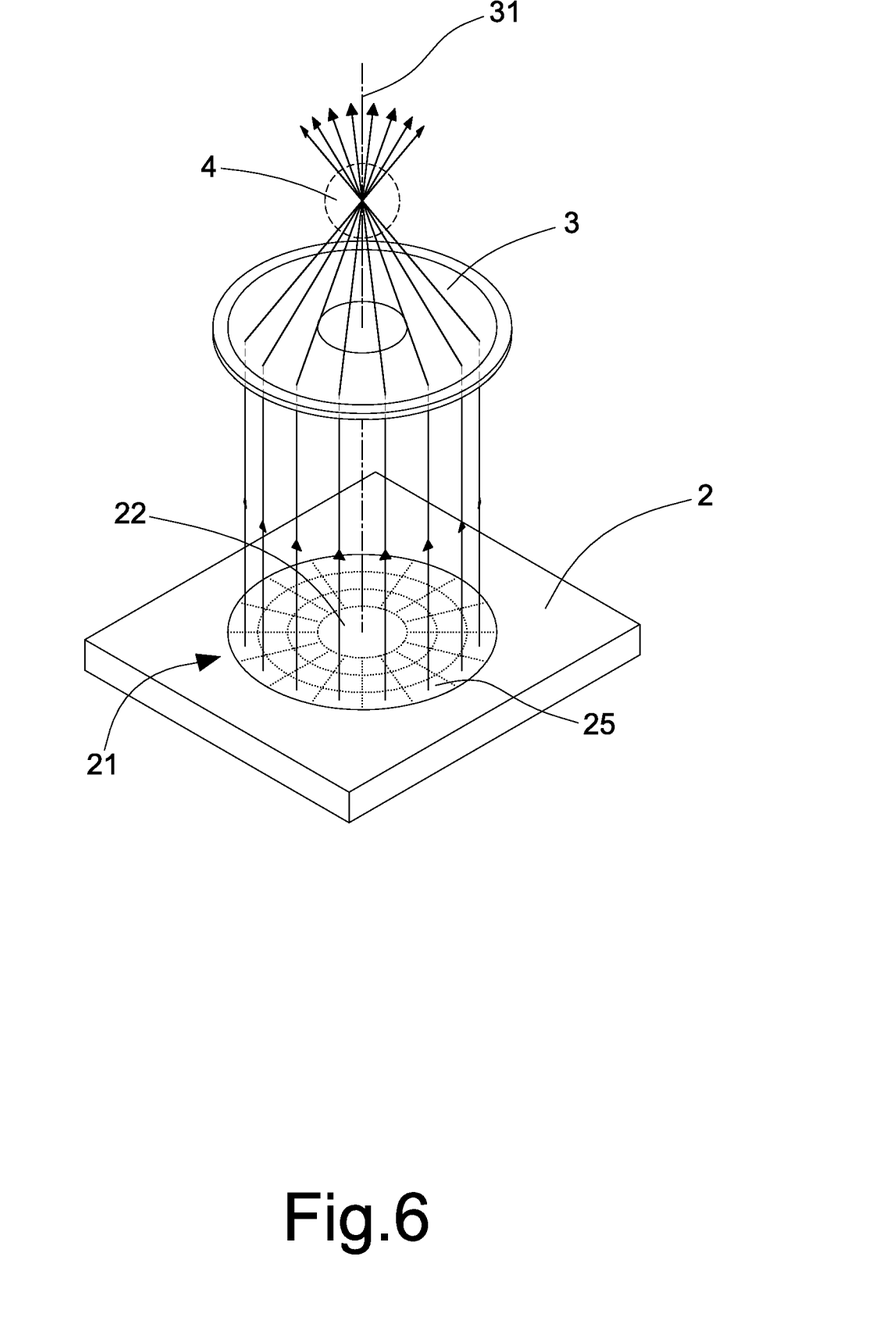
FIG. 6 is a schematic view showing picture frames in the same ring in time of projecting and deflecting image beams.
Figure 7:
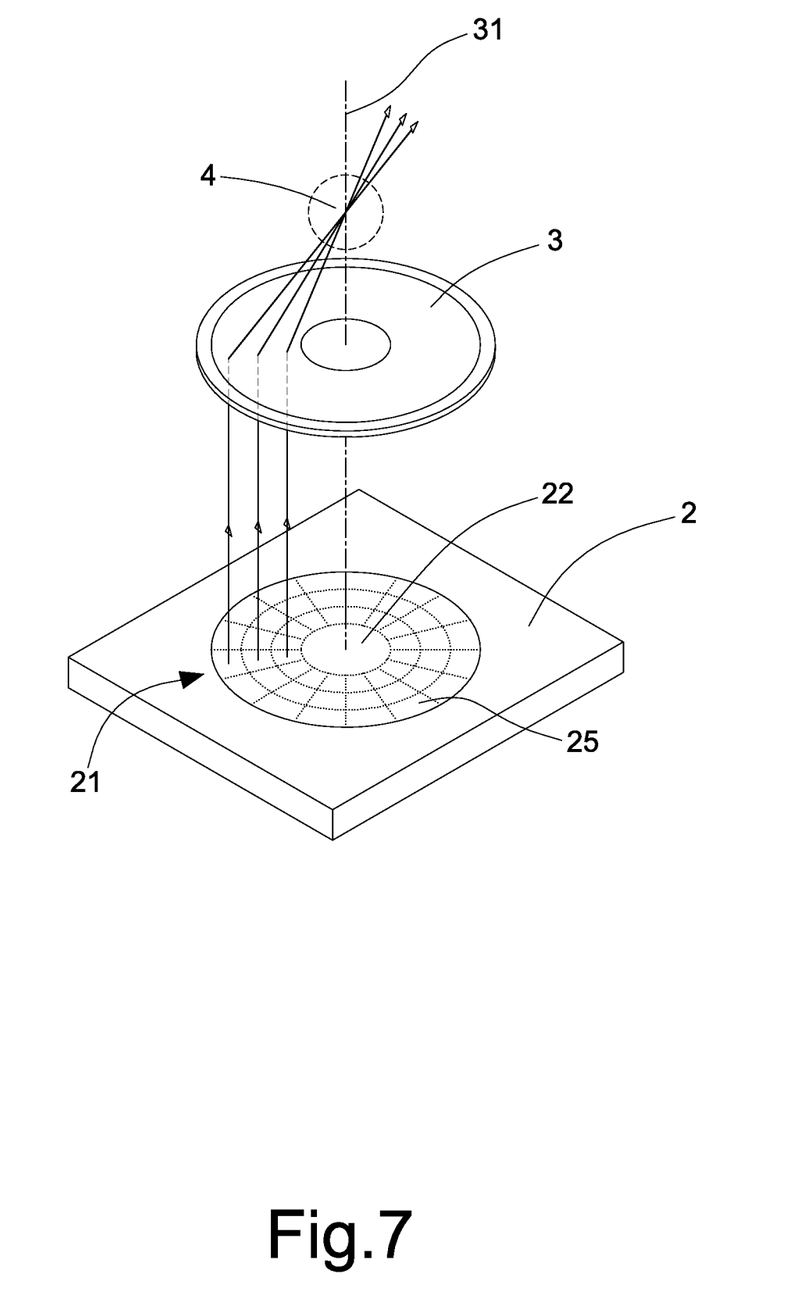
FIG. 7 is a schematic view showing the picture frames in different concentric rings in time of projecting image beams but deflecting the same toward different angles.

Referring to FIGS. 6 and 7, the multiple image projector 1 is in operation. Herein, the picture frames 25 at the outmost periphery of the displaying area 21 project image beams upward in time of displaying images. Accordingly, the image beams further deflect toward the center axis 31 through the refracting unit 3. Further, all the image beams converge at a spot, a right top of the central area 22, so that the spot becomes an imaging area 4 (as shown in FIG. 6). As to the picture frames 25 at the middle and at the innermost of the displaying area 21, the image beams projected therefrom travel in accordance with the route of the picture frames at the outmost of the displaying area 21. Namely, the image beams still deflect toward the center axis 31 through the refracting unit 3 and converge at the imaging area 4. Referring to FIG. 7, although the refracting angle of image beams of the picture frames 25 at either the innermost, middle, or outmost of the displaying area 21 are different, the image beams still converge at the imaging area 4.

Figure 8:
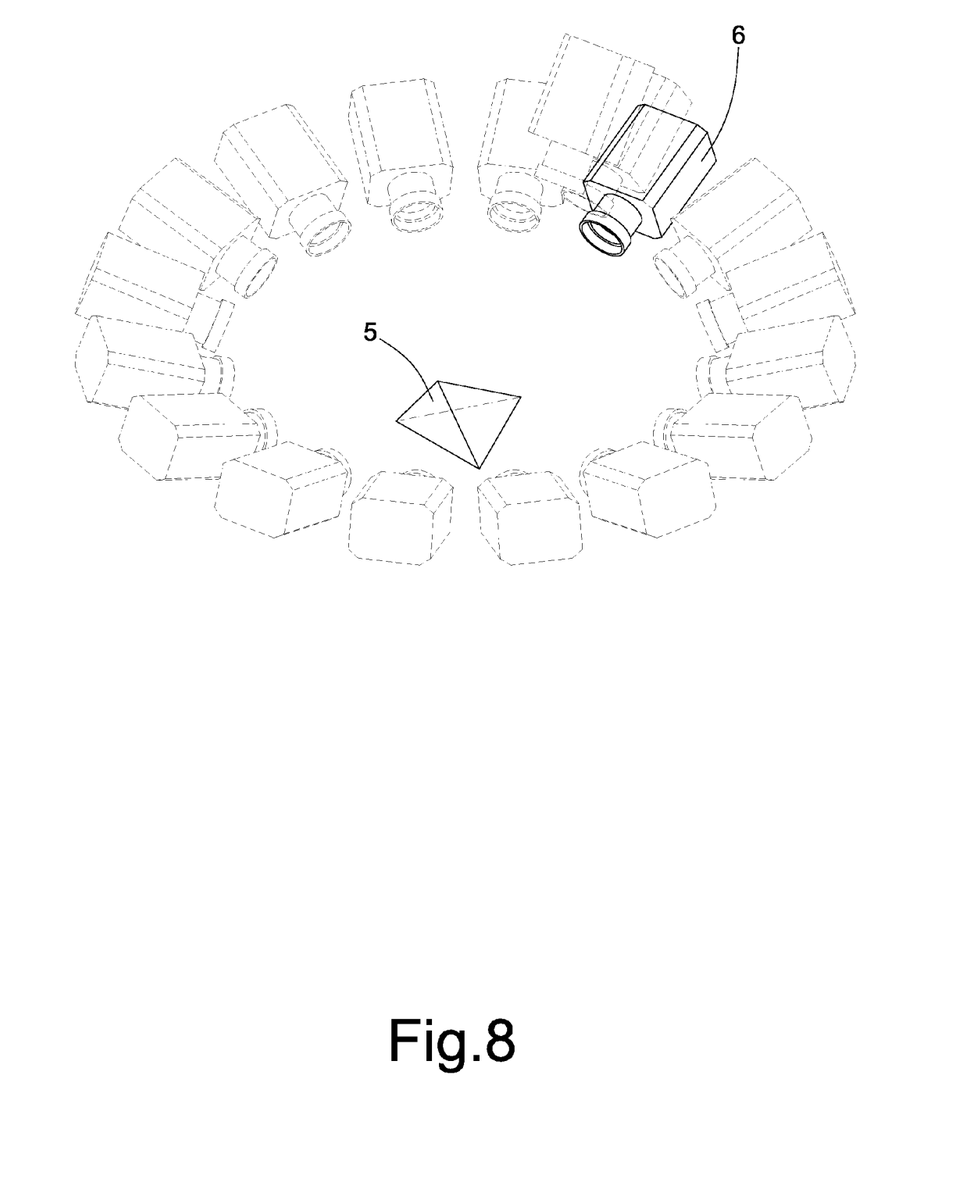
FIG. 8 is a schematic view showing an object being shot.

Referring to FIG. 8, an object 5 is about to be shot by the multiple image projector 1. The object 5 is surroundingly shot by a camera 6 with respect to a coherent angle in equidistance. Wherein, the camera 6 is set around the object 5 with consistent elevating angle, thereby surroundingly obtaining a plurality of images of the object 5 along the correspondent radial lines 24. Each image of the object 5 has an angle difference of sixteen three hundred and sixtieths degrees from that of the adjacent picture. Moreover, the elevating angle of the camera 6 is divided into three different elevating angles in accordance with the concentric rings 23. Thereby, one elevating angle of the camera 6 surroundingly takes sixteen images, and three elevating angles of the camera 6 surroundingly take forty-eight images in total.

Figure 9:
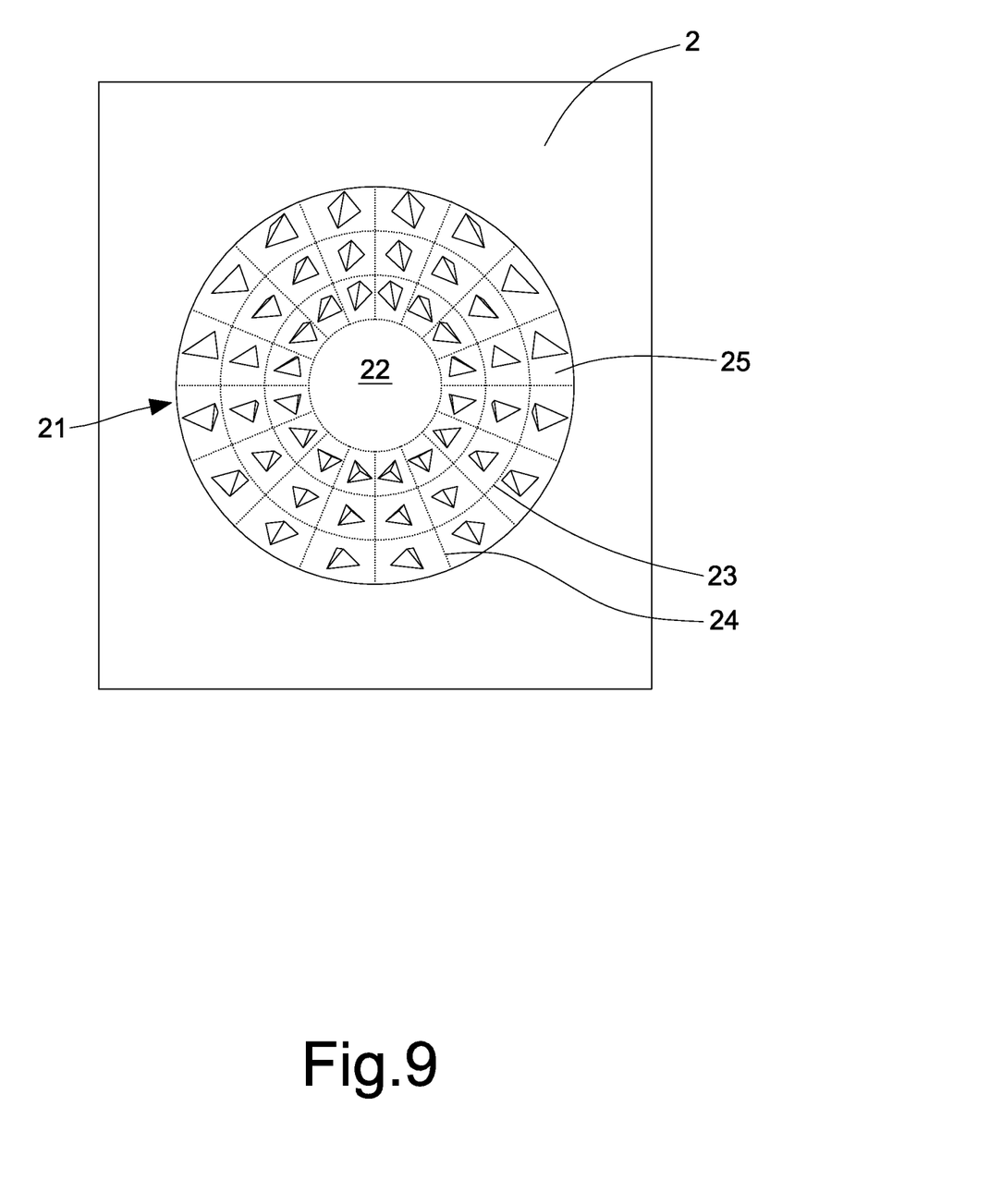
FIG. 9 is a schematic view showing the images of the object being respectively presented on the picture frames.

Succeedingly, the images are transmitted to the displaying unit 2 as shown in FIG. 9. Each picture frame 25 performs one image. Wherein, the image obtained at an adjacent angle with respect to the same elevating angle is performed on the adjacent picture frame 25, and the images shot in accordance with the same elevating angle are accordingly performed on the picture frames 25 in one single concentric ring. Further, the images shot with respect to the same angle but different elevating angles are performed in the same row of the picture frames 25. Especially, the images shot with respect to the highest elevating angle are presented on the picture frames 25 in the innermost concentric ring; the images shot with respect to the lowest elevating angle are presented on the picture frames 25 in the outmost concentric ring.

Figure 10:
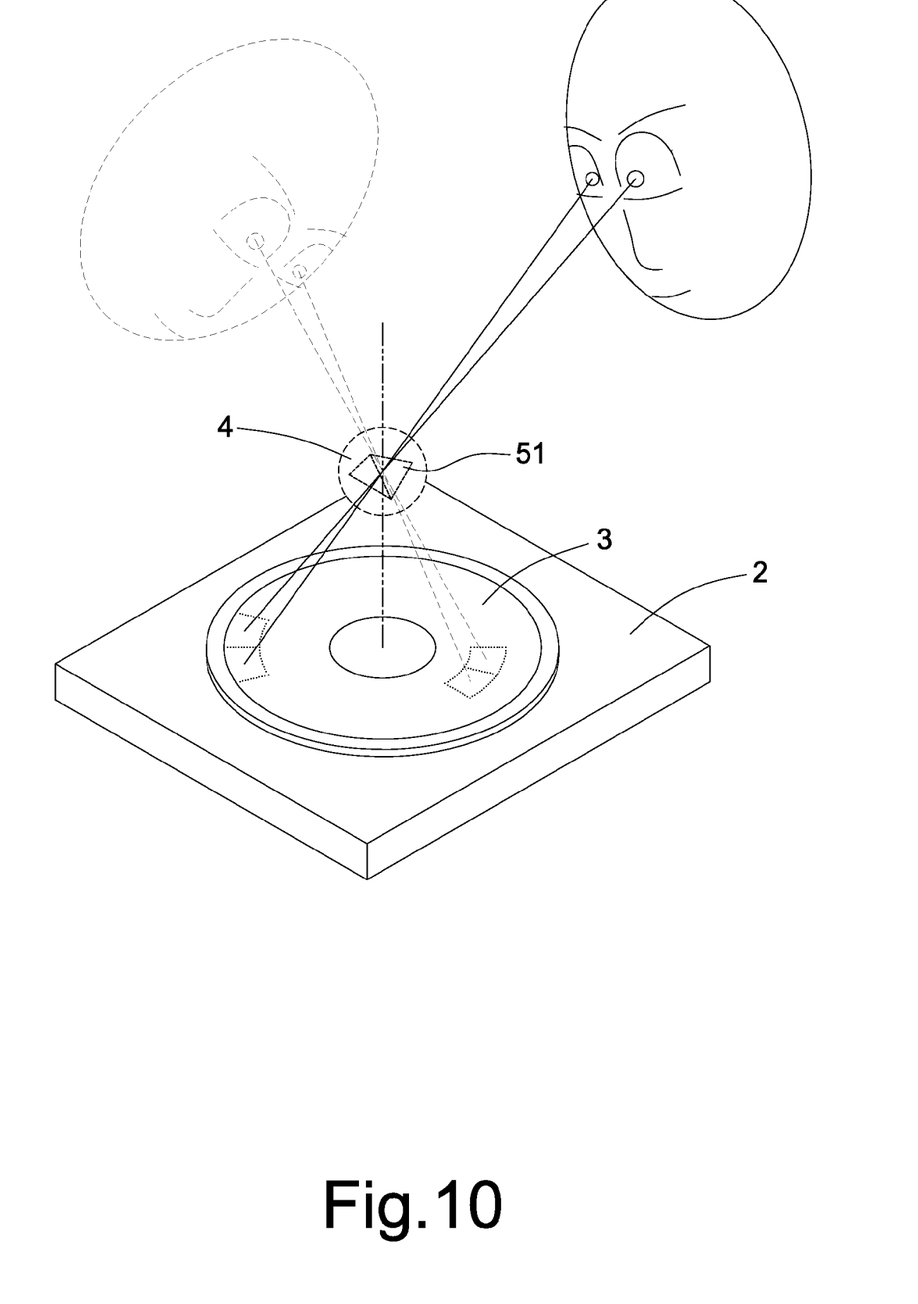
FIG. 10 is a schematic view showing observers could surroundingly see a solid image along any observing angle.
Figure 11:
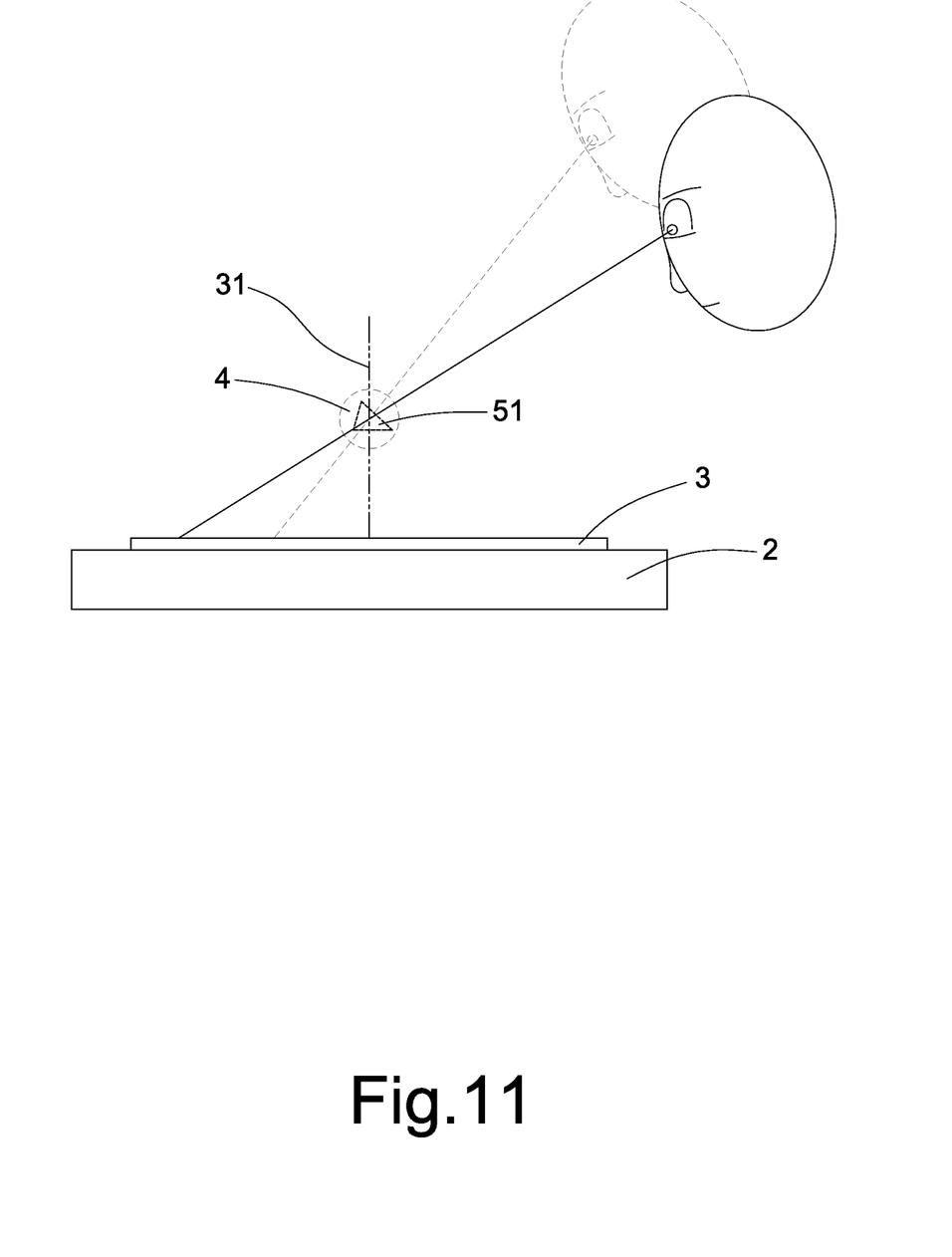
FIG. 11 is a schematic view showing observers could see a solid image along any elevating angle.

Referring to FIGS. 10 and 11, in operation, the multiple image projector 1 projects image beams from the displaying unit 2. Accordingly, the image beams further converge at the imaging area 4 after being deflected by the refracting unit 3 and then scatter widely. In the meantime, observers stand at any proper places around the multiple image projector 1. Wherein, two images on the picture frames 25 of different shooting angles will be respectively projected toward observer's eyes. Thereby, a solid image 51 of the object 5 is constructed on the imaging area 4 above the central area according to the binocular parallax. Preferably, if the observer is taller, the picture frames 25 in the innermost concentric ring will be seen since the images that are shot with respect to a higher elevating angle are projected; if the observer is shorter, the picture frames 25 in the outmost concentric ring will be seen since the images that are shot with respect to a lower elevating angle are projected. Thereby, a three-dimensional image is preferably projected.

Figure 12:
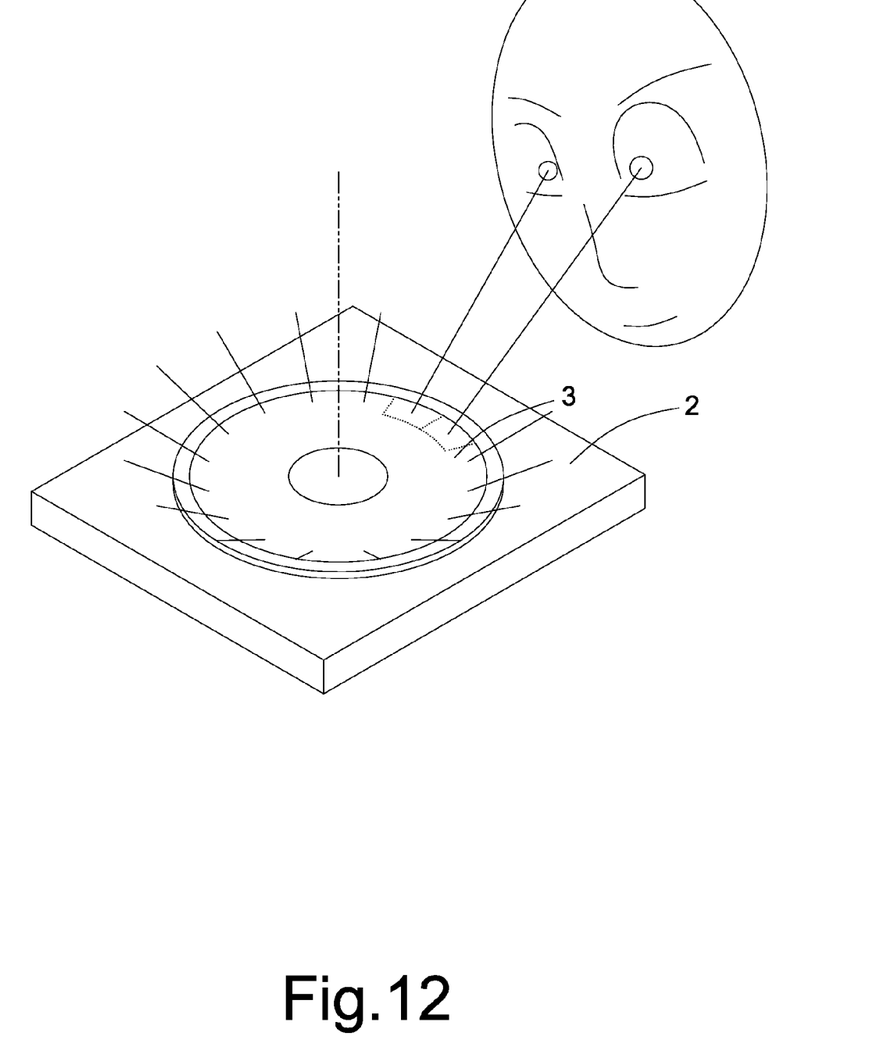
FIG. 12 is a schematic view showing the image beams being deflected deviating from the central axis; the image beams does not converge but could be projected toward observer's eyes.

Afore preferred embodiment could be alternatively changed but not depart from the spirit of the present invention. For example, the picture frames 25 in the displaying area 21 could be further divided into one, two, four, or more concentric rings. Favorably, the refracting unit 3 as shown in FIG. 12 could freely deflect the image beams toward a direction departing from the center axis. Thereby, the image beams would not converge but could be directly projected toward observer's eyes. In this manner, the imaging area 4 is thence constructed under the multiple image projector 1.

Figure 13:
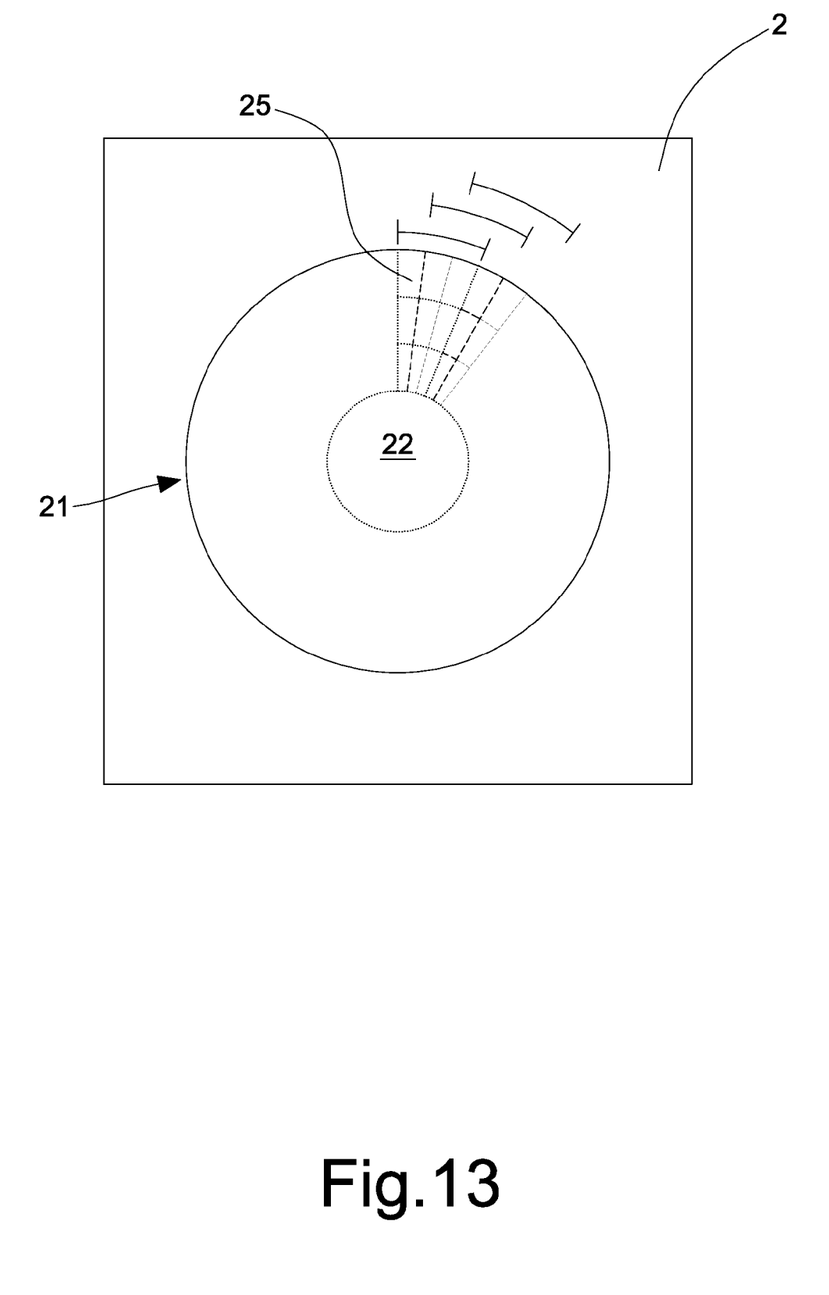
FIG. 13 is a schematic view showing the picture frame convoluting backward with respect to the center of the central area in accordance with one third angle in the persistence of vision.

Referring to FIG. 13, within the persistence of vision, the picture frame 25 in the displaying area 21 convolutes backward with respect to any proper angle along a center of the central area 22 equiangularly. The proper angle may adopt one third, a quarter, or one fifth base on the center. Thereby, observers could see more delicate images, so that the pixel of the solid image is preferably enhanced. Actually, the persistence of vision is a phenomenon of eyes by which an after-image is thought to persist for a short time. Moreover, the backward convolution of the picture frame 25 could be simply achieved while the displaying unit 2 changes its displaying content. Namely, no extra power source is needed for motivating the displaying unit 2 or the refracting unit 3. Obviously, the structure is simplified, and the construction is more durable.

Figure 14:
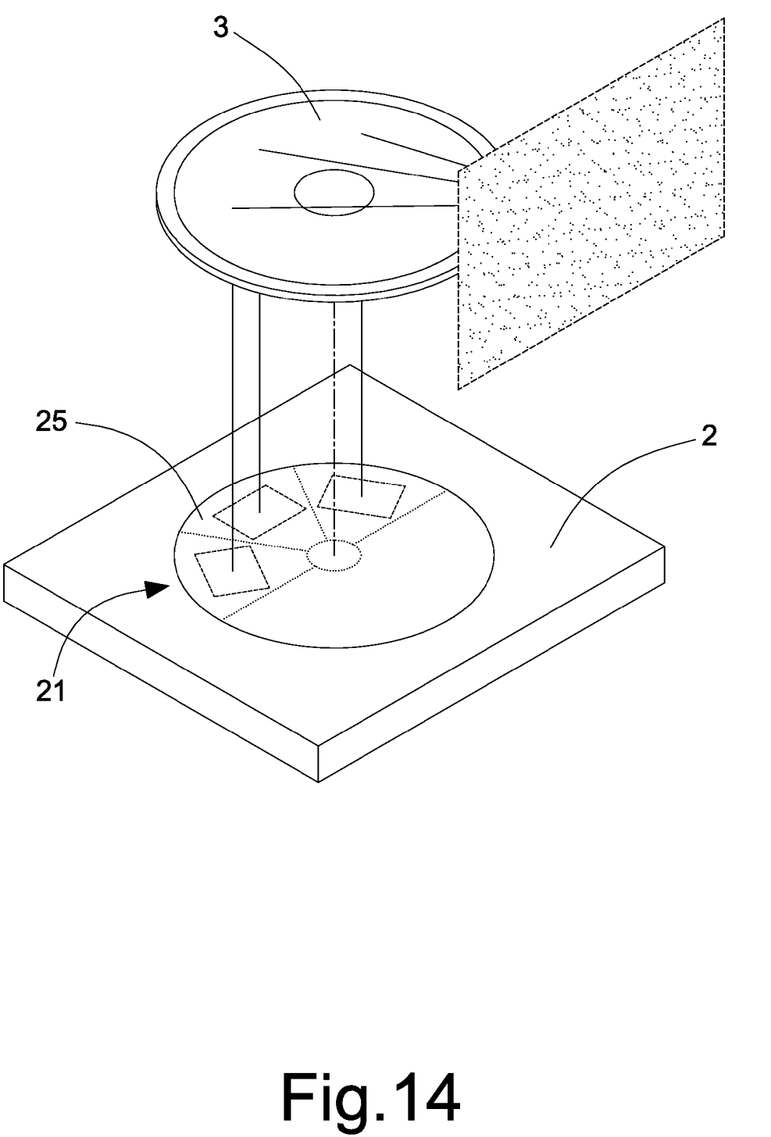
FIG. 14 is a schematic view showing the present invention being applied in a television that presents solid images.

Referring to FIG. 14, when only half displaying area 21 is utilized and further divided into three picture frames 25, a larger image could be preferably projected. Thereby, a 3D television could be brought about and users do not have to wear polarized glasses since the solid image is available for the naked eyes.

While we have shown and described the embodiment in accordance with the present invention, it should be clear to those skilled in the art that further embodiments may be made without departing from the scope of the present invention.

I claim:

1. A means for 3D imaging, wherein, an object is surrounded by fixed distance and circumferential shots from equal angles, respectively, for acquiring a plurality of plane images at each of a plurality of elevating angles, and a displaying unit has a plurality of concentric ring displaying areas, a number of the elevating angles being equal to that of the concentric ring displaying areas, each concentric ring displaying area being divided into a plurality of picture frames to display corresponding plane images at a predetermined elevating angle, respectively; any two of said frames in different angles being concurrently projected via the displaying unit and respectively deflected by a refracting unit into human eyes; visual data of said two frames being transmitted to human brains for being integrated to accordingly present a solid image of said object.

2. A facility for 3D imaging, said facility being a multiple image projector which comprises a displaying unit and a refracting unit; wherein, an object is surrounded by fixed distance and circumferential shots from equal angles, respectively, for acquiring a plurality of plane images at each of a plurality of elevating angles;

said displaying unit having a displaying area, on which a central area is formed; said displaying area except for said central area being formed with a plurality of concentric ring displaying areas, a number of the elevating angles being equal to that of the concentric ring displaying areas, and each concentric ring displaying area being divided into a plurality of picture frames to display corresponding plane images at a predetermined elevating angle, respectively; said displaying unit creating image beams;

said refracting unit being installed on said displaying unit; a dimension of said refracting unit justly covering a scope of said displaying area, thereby allowing a penetration of said image beam to deflect toward a designated direction;

while individually presenting images in different angles from each of said picture frames, each image beam traveling through said refracting unit and then deflecting to said designated direction by a designated angle; whereby any two of said images in different angles being respectively projected to human eyes to present a solid image of said object.

3. The facility as claimed in claim 2, wherein, said displaying unit adopts an LCD displaying unit, an organic LED displaying unit, an array-based LED displaying unit, or a plasma displaying unit.

4. The facility as claimed in claim 2, wherein, said displaying area adopts a rounded shape; said central area is formed at a center of said rounded displaying area;

plural concentric rings are arranged outside said central area; numerous radial lines equidistantly radiate from said center of said central area; said rings and said radial lines are interlaced crisscross so as to divide said displaying area into said picture frames.

5. The facility as claimed in claim 2, wherein, said refracting unit adopts an optical unit formed with a round plate; said image beams traveling through said refracting unit further deflect toward a direction of a center axis of said optical unit; said refracting unit deflects beams along a direction deviating from said center axis.

6. The facility as claimed in claim 2, wherein, said displaying area adopts a rounded shape; said central area is formed at a center of said rounded displaying area;

said refracting unit adopts an optical unit formed with a rounded plate; a center of said refracting unit is aligned with said center of said central area so as to integrally mount said refracting unit on said displaying unit.

7. The facility as claimed in claim 6, wherein, deflections of said image beams converge on a specified spot, which becomes an imaging area.

8. The facility as claimed in claim 5, wherein, said optical unit adopts an optical lens, a diffraction unit, or a prism capable of deflecting beams; said optical unit further adopts a micro structure formed with multiple concentric rings or a micro structure formed with interference fringes of hologram.

9. The facility as claimed in claim 2, wherein, within the persistence of vision, the picture frame convolutes backward with respect to any proper angle along a center of said central area equiangularly; said proper angle is one third, a quarter, or one fifth base on said center.

10. The facility as claimed in claim 9, wherein, said persistence of vision is a phenomenon of eyes by which an afterimage is thought to persist for a short time.

* * * * *